Aug. 13, 1929.  E. H. UNKLES  1,724,118
TELESCOPE MOUNTING
Original Filed Oct. 5, 1917   2 Sheets-Sheet 1
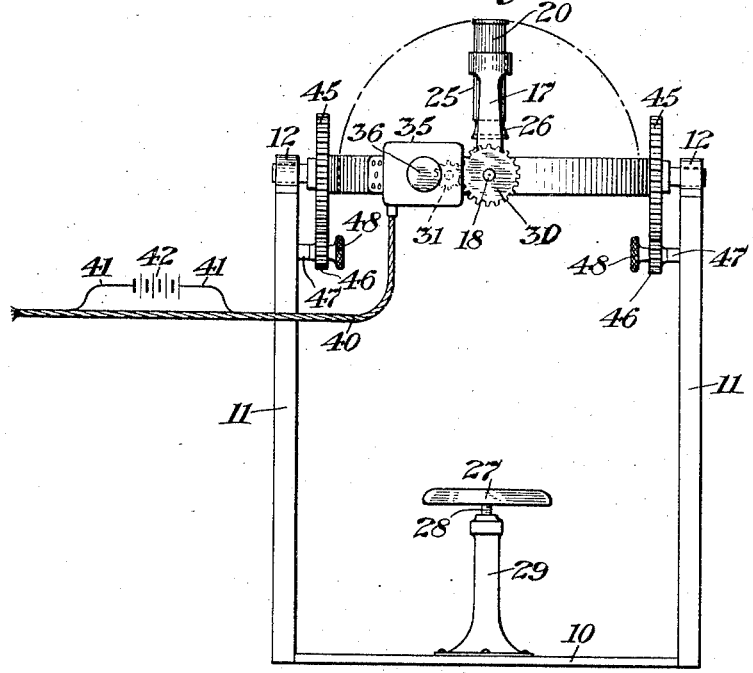
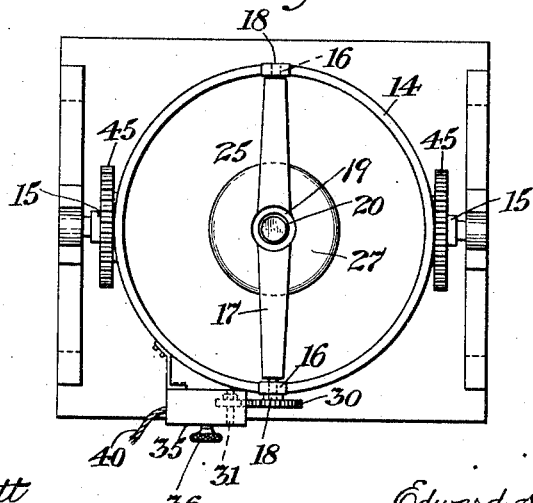
WITNESS
Chas. F. Clagett
INVENTOR
Edward Harrison Unkles
BY
A. S. Gardner.
HIS ATTORNEY Aug. 13, 1929.   E. H. UNKLES   1,724,118
TELESCOPE MOUNTING
Original Filed Oct. 5, 1917   2 Sheets-Sheet 2

WITNESS:
Chas. F. Clagett

INVENTOR
Edward Harrison Unkles
A. J. Gardner
HIS ATTORNEY

Patented Aug. 13, 1929.

1,724,118

UNITED STATES PATENT OFFICE.

EDWARD HARRISON UNKLES, OF NEW YORK, N. Y., ASSIGNOR TO JOHN HAYS HAMMOND, JR., OF GLOUCESTER, MASSACHUSETTS.

TELESCOPE MOUNTING.

Application filed October 5, 1917, Serial No. 194,966. Renewed September 12, 1922. Serial No. 587,853.

Some of the objects of this invention are to provide an improved telescope and mounting therefor whereby continuous observations may be conveniently made of aircraft or other objects while in motion; to provide an improved telescope and mounting therefor in combination with motion transmission means arranged to be actuated as a result of the angular movement of the telescope; to provide an improved telescope mounting including means for effecting a very fine angular adjustment of the telescope; and to provide other improvements as will appear hereinafter.

Figure 3:
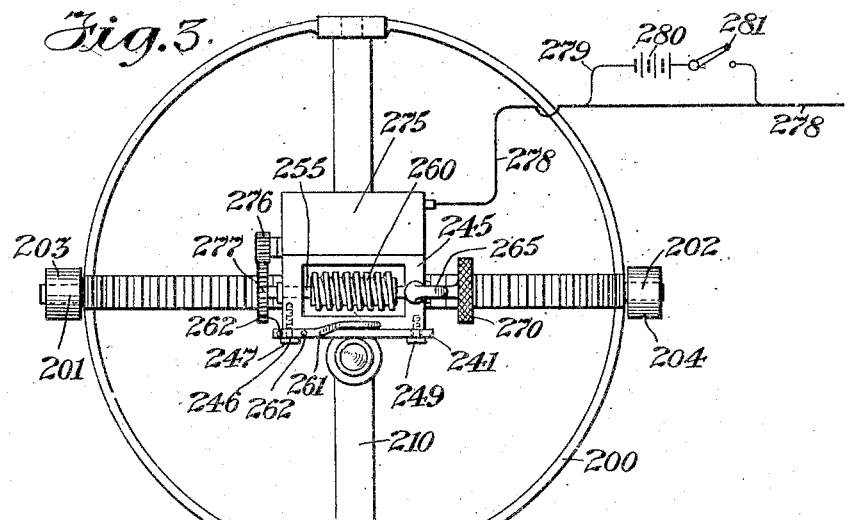
Figure 4:
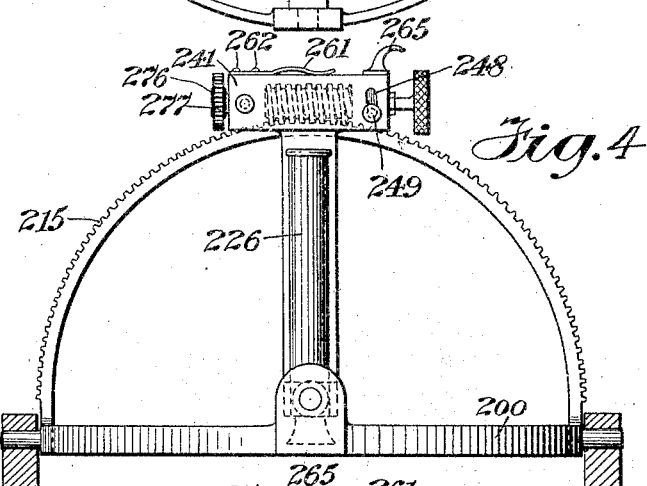
Figure 5:
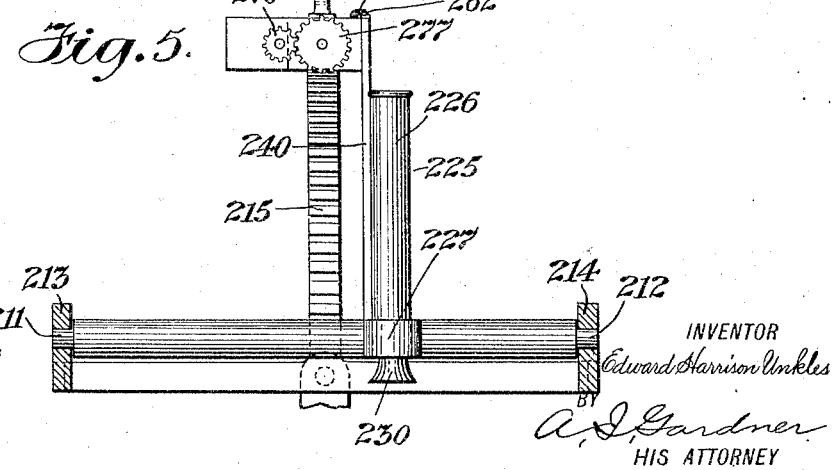

In the accompanying drawings, Figs. 1 and 2 are a side elevation and a top plan view, respectively, of one form of telescope and mounting therefor constructed in accordance with this invention; Figs. 3, 4 and 5 are a top plan view, a side and an end elevation respectively of a third modified form of this invention.

Referring to the drawings, and particularly to Figs. 1 and 2, one embodiment of this invention comprises a rigid stationary platform or base 10, secured to and projecting upwardly from which are a pair of vertical rigid stationary standards 11—11, which are provided at their upper ends respectively with two horizontally alined bearings 12—12. Between these bearings 12—12 is arranged an annular member or gimbal ring 14 having diametrically opposed trunnions 15—15 rigid therewith and which are rotatably supported in the bearings 12—12, and support the ring 14 to swing about a fixed horizontal axis. The ring 14 is also provided with diametrically opposed cylindrical bearings 16—16, the longitudinal axes of which coincide with a line which extends diametrically of the ring 14 and which is perpendicular to and intersects the horizontal axis of oscillation of the ring 14.

Normally extending above the ring 14 is a yoke 17 which is terminally provided with two trunnions 18, 18 which fit snugly but rotatably in the bearings 16—16 respectively of the ring 14. The yoke 17 is provided centrally with a sleeve 19 forming a part thereof and in which is rigidly secured the body portion 20 of a straight telescope 25 of any well known or suitable construction, and which is arranged so that its longitudinal axis passes at all times through the fixed horizontal axis of oscillation of the ring 14 and the movable axis of oscillation of the yoke 17 with respect to the ring 14.

The telescope 25 includes an eyepiece 26 of any well known or suitable construction which is slidably arranged in the inner end of the body portion 20 of the telescope, and which is adjustable longitudinally of the body portion 20 in a well known manner. This eyepiece 26 is preferably arranged in such a manner that its inner end is ordinarily in close proximity to the point of intersection of the horizontal axis of oscillation of the ring 14, and the movable axis of oscillation of the yoke 17 with respect to the ring 14.

For the convenience of the operator, a seat of any suitable construction may be arranged between the standards 11. Preferably, a circular seat 27 is used for this purpose and is rigidly secured to the upper end of a vertical screw 28 which extends downwardly from the seat 27 and is threaded into a vertical standard 29 which is rigidly secured to the base 10, the seat 27 being thus vertically adjustable and being arranged to rotate about a vertical axis which preferably passes through the point of intersection of the horizontal axis of oscillation of the ring 14 with the movable axis of oscillation of the yoke 17 with respect to the ring 14. The seat 27 is arranged to be adjusted vertically into such a position that when an operator is upon the seat 27, it will be possible for the operator to look through the eyepiece 26 of the telescope while the telescope is being swung both about the horizontal axis of oscillation of the ring 14 and about the axis of oscillation of the yoke 17, to follow an air craft or other object moving over any part of the sky.

For swinging the yoke 17 and the telescope 25 carried thereby with respect to the ring 14, and for simultaneously transmitting the angular movement of the yoke 17 with respect to the ring 14 to a suitable indicating device or other motion repeating mechanism (not shown), a gear 30 is secured rigidly to one of the trunnions 18 of the yoke 17 and engages a gear 31 which is arranged to rotate about an axis parallel to the axis of oscillation of the yoke 17 with respect to the ring 14.

The latter gear 31 forms part of an electric motion transmission device of any well known or suitable construction which is arranged in a casing 35 which is rigidly secured to the ring 14, and the gear 31 is arranged to be rotated by a rotatable knob 36 which is carried by and extends outside of the casing 35. The angular movement of the yoke 17 with respect to the ring 14 is transmitted in a well known manner by electric transmission means in the casing 35, through a four wire cable 40 to any desired electric repeating mechanism. The four wire cable 40 includes a return circuit 41 which is arranged to be energized by a battery 42 or other source of electric energy.

For conveniently rotating the ring 14 and the yoke 17 and telescope 25 carried thereby about the fixed horizontal axis of the ring 14, a pair of gears 45—45 are rigidly secured to the trunnions 15—15 of the ring 14, and are arranged to be engaged respectively by two pinions 46—46 which are arranged to rotate about fixed axes on two studs 47—47 which are rigid with the two standards 11—11 respectively.

Rigidly secured to the two pinions 46—46 respectively, are two knurled knobs 48—48 which are coaxial with the two pinions 46—46 respectively. By rotating either of the knobs 48—48 either in one direction or in an opposite direction, the ring 14 and the yoke 17 and telescope 25 carried thereby may be simultaneously rotated accordingly about the fixed horizontal axis of the ring 14. Instead of the pinions 46—46 and the knobs 48—48 for rotating the ring 14, an electrical motion transmission device similar to the transmission device in the casing 35 might be substituted to act upon either one of the gears 45 for rotatably adjusting the ring 14 and for simultaneously transmitting the angular movement of the ring about its horizontal axis to any suitable motion repeating mechanism or indicating device.

The modified form of this invention shown in Figs. 3, 4 and 5 comprises a rigid ring 200 which is arranged to rotate about a fixed, substantially horizontal axis upon two diametrically opposed trunnions 201 and 202 rigid with the ring and engaging snugly but rotatably in bearings provided therefor in two fixed supports 203 and 204 respectively. Extending across the ring 200 is a shaft 210 which is arranged so that its longitudinal axis is parallel to and spaced slightly from the plane of the ring 200 and is perpendicular to a plane which includes the axis of oscillation of the ring 200 and which is perpendicular to the plane of the ring 200. This shaft 210 is arranged to rotate about an axis coincident with its longitudinal axis upon two trunnions 211 and 212 which are rigid with the opposite ends of the shaft 210 respectively and which engage snugly but rotatably respectively in two bearings 213 and 214 which are rigid with the ring 200. Arranged in a plane perpendicular to the plane of the ring 200 and which includes the axis of oscillation of the ring 200 is a segmental worm-gear 215 the major portion of which in side elevation is in the form of a semi-circle, the center of which lies in the axis of the shaft 210 and the outside diameter of which is approximately equal to the outside diameter of the ring 200. The opposite ends of this gear 215 are extended slightly beyond the semi-circular form and are rigidly secured to the two diametrically opposite portions of the ring 200. Arranged in a plane parallel to the plane of the segmental gear 215 is a telescope 225 which comprises an elongated tubular body portion 226 the inner end of which is rigidly secured to the shaft 210 in a sleeve 227 which forms a part of the shaft 210. The inner end body portion 226 of the telescope is provided with an eye-piece 230 of any well known or suitable construction which engages slidably in the inner end of the body portion 226 of the telescope and which is adjustable longitudinally of the body portion. The body portion 226 of the telescope is so arranged that its longitudinal axis intersects the longitudinal axis of the shaft 210 and so that the body portion 226 extends outwardly from the shaft 210 in the direction of the segmental gear 215.

For swinging the telescope 225 about the longitudinal axis of the shaft 210 a flat, rigid bar 240 is rigidly secured at one end to the shaft 210 and extends outwardly from the shaft 210 between the telescope 225 and the segmental gear 215 and in a plane parallel to the plane of the segmental gear and in a direction parallel to the longitudinal axis of the telescope 225. Upon the outer end of this bar 240 is rigidly secured an oblong rectangular base-plate 241 which is arranged in a plane with the bar 240 and so that the longitudinal axis of the plate extends in a direction perpendicular to the longitudinal axis of the bar 240. Slidably engaging the base-plate 241 is an open rectangular rigid frame 245 which is arranged to oscillate with respect to the plate 241 about a pivot 246 which extends snugly but rotatably through a central opening provided therefor in one end of the plate 241 and which is rigidly secured in an opening provided therefor in a corresponding end of the frame 245, the pivot 246 being provided at its outer end with a head 247 to hold the frame 245 in sliding engagement with the plate 241. Extending slidably through a segmental slot 248 provided therefor in the other end of the plate 241 is a bolt 249 which is threaded into the corresponding end of the frame 245 and which acts to limit the swinging movement of the frame 245 with respect to the plate 241 and also to hold the frame 245 in sliding engagement with the plate 241. Extending longitudinally and centrally through the frame 245 is a spindle 255, the opposite ends of which are snugly but rotatably mounted in suitable bearings provided therefor in the opposite ends of the frame, the spindle 255 being thus arranged to rotate with respect to the frame 245 about an axis coincident with the longitudinal axis of the spindle and arranged at all times in a plane extending centrally through the segmental gear 215 and including the axis of oscillation of the ring 200. Arranged within the frame 245 and surrounding the spindle 255 and rigidly secured thereto is a worm-gear 260 which is arranged to engage the segmental worm-gear 215 when the frame 245 is in its innermost position of rotation about its pivot 246, and to be out of engagement with the segmental gear 215 when the frame 245 is in its outermost position of rotation about its pivot 246. The frame 245 is normally held yieldingly in its innermost position with the worm 260 in engagement with the worm gear 215 by means of a leaf spring 261, one end of which is rigidly secured to one edge of the plate 241 as by screws 262 and the other end of which normally presses inwardly upon the outer surface of the frame 245. A handle 265 is rigidly secured to the free end of the frame 245 for conveniently swinging the frame outwardly against the action of the spring 261 without changing the position of rotation of the worm 260. A knurled knob 270 is rigidly secured to one end of the spindle 255 to permit of the convenient rotation of the spindle and the worm 260 carried thereby to vary the position of rotation of the telescope 225 about the longitudinal axis of the shaft 210.

For transmitting the rotary movement of the spindle and consequently the rotary movement of the telescope 225 about the longitudinal axis of the shaft 210 any suitable electric motion repeating mechanism 275 may be rigidly secured to the frame 245 and may be arranged to be actuated by a gear 276 arranged to rotate about an axis fixed with respect to the frame 245 and extending in a direction parallel to the longitudinal axis of the spindle 255. The gear 276 may be arranged to be actuated by a pinion 277 rigidly secured to one end of the spindle 255. The electrical transmitting mechanism 275 may be electrically connected in a well known manner to any suitable repeating mechanism (not shown) by means of a four-wire electric cable 278 including a return wire 279 arranged to be energized by a battery 280 or other suitable source of electric energy and to be controlled by a switch 281.

In the operation of the form of this invention shown in Figs. 3, 4 and 5 the telescope 225 may be rotated in either direction about the longitudinal axis of the shaft 210 or in either direction about the axis of oscillation about the ring 200 to aim the telescope in any desired direction. The rotation of the telescope 225 through a small arc about the longitudinal axis of the shaft 210 may be conveniently effected by rotating the knurled knob 270 manually, but when it is desired to rotate the telescope 225 quickly through a relatively large arc about the longitudinal axis of the shaft 210, the operator may withdraw the worm 260 from engagement with the worm-gear 215 by moving the handle 265 outwardly and may then swing the telescope free through any desired arc about the longitudinal axis of the shaft 210 into approximately any desired position, whereupon the handle 265 may be released to permit the worm 260 to be moved into engagement with the gear 215 under the action of the spring 261. When the telescope 225 is thus rotated through a comparatively large number of degrees about the longitudinal axis of the shaft 210, a second operator should be notified of the number of degrees through which the telescope has been thus rotated and should readjust the motion repeating mechanism accordingly before the worm 260 is again rotated.

Although only a few of the many forms in which this invention may be embodied have been shown herein it is to be understood that the invention is not limited to any specific construction but might also be embodied in various other forms without departing from the spirit of the invention or the scope of the appended claims.

I claim:

1. The combination with an annular support, arranged to oscillate about a predetermined axis, of a yoke arranged upon one side of and extending across said support and arranged to oscillate with respect to said support about an axis fixed with respect to said support and at right angles to the axis of said support, and a telescope carried by said yoke and having an eyepiece arranged substantially at the intersection of said axes.

2. The combination with an annular support pivoted for movement about a horizontal axis, of a pair of diametrically opposed pivots engaging said annular support, a semi-circular yoke mounted on said pivots and positioned wholly on one side of said annular support and arranged to oscillate with respect thereto about an axis at right angles to the axis of said support, and a telescope carried by said yoke and extending parallel to a radius thereof.

Signed at New York, in the county of New York, and State of New York, this 27th day of September A. D. 1917.

EDWARD HARRISON UNKLES.